United States Patent
Tönsgård et al.

(10) Patent No.: US 11,201,912 B2
(45) Date of Patent: Dec. 14, 2021

(54) COMMUNICATION DEVICE FOR IMPROVED ESTABLISHING OF A CONNECTION BETWEEN DEVICES

(71) Applicant: CRUNCHFISH DIGITAL CASH AB, Malmö (SE)

(72) Inventors: Carl Tönsgård, Malmö (SE); Konrad Beckmann, Malmö (SE); Joachim Samuelsson, Helsingborg (SE)

(73) Assignee: CRUNCHFISH DIGITAL CASH AB, Malmö (SE)

( * ) Notice: Subject to any disclaimer, the term of this patent is extended or adjusted under 35 U.S.C. 154(b) by 61 days.

(21) Appl. No.: 15/534,854

(22) PCT Filed: Dec. 9, 2015

(86) PCT No.: PCT/SE2015/051319
§ 371 (c)(1),
(2) Date: Jun. 9, 2017

(87) PCT Pub. No.: WO2016/093764
PCT Pub. Date: Jun. 16, 2016

(65) Prior Publication Data
US 2017/0325275 A1     Nov. 9, 2017

(30) Foreign Application Priority Data
Dec. 10, 2014 (SE) .................... 1451509-2

(51) Int. Cl.
*H04L 29/08* (2006.01)
*H04W 4/02* (2018.01)
(Continued)

(52) U.S. Cl.
CPC ............. *H04L 67/10* (2013.01); *H04W 4/023* (2013.01); *H04W 4/80* (2018.02); *H04W 76/15* (2018.02);
(Continued)

(58) Field of Classification Search
CPC .......... H04L 2012/5608; H04W 84/12; H04W 88/08; H04W 80/04; H04W 88/06;
(Continued)

(56) References Cited

U.S. PATENT DOCUMENTS

| 8,806,530 | B1 * | 8/2014 | Izdepski | .............. | H04N 21/258 |
| | | | | | 725/141 |
| 2002/0085511 | A1 * | 7/2002 | Koponen | ............ | H04M 1/7253 |
| | | | | | 370/315 |

(Continued)

FOREIGN PATENT DOCUMENTS

EP     1633104 A1     3/2006

OTHER PUBLICATIONS

Swedish Search Report and Written Opinion of SE 1651082-8 dated Feb. 1, 2017, all enclosed pages cited.

(Continued)

*Primary Examiner* — Brenda H Pham
(74) *Attorney, Agent, or Firm* — Burr & Forman, LLP

(57) ABSTRACT

A communication device (100) being part of a proximity-based sharing network (400), said communication device comprising a controller (210) and a radio frequency interface (230), wherein the controller is configured to: detect that a second communication device (100B) is in an immediate proximity and in response thereto automatically establishing a connection (430) for sharing content.

25 Claims, 9 Drawing Sheets

(51) Int. Cl.
*H04W 76/15* (2018.01)
*H04W 4/80* (2018.01)
H04W 84/18 (2009.01)
G06Q 20/10 (2012.01)
G06Q 20/32 (2012.01)

(52) U.S. Cl.
CPC ........... *G06Q 20/10* (2013.01); *G06Q 20/322* (2013.01); *H04W 84/18* (2013.01)

(58) Field of Classification Search
CPC ..... H04W 84/18; H04W 36/30; H04W 36/24; H04W 74/08; H04W 84/08; H04W 76/02; H04W 72/04; H04B 7/2125; H04B 7/2126
USPC ..... 370/310.2, 324, 328, 338, 332, 349, 341
See application file for complete search history.

(56) References Cited

U.S. PATENT DOCUMENTS

| | | | | |
|---|---|---|---|---|
| 2004/0235450 | A1* | 11/2004 | Rosenberg | G06Q 20/085 455/406 |
| 2009/0111378 | A1* | 4/2009 | Sheynman | H04W 8/005 455/41.1 |
| 2009/0143056 | A1* | 6/2009 | Tang | H04M 1/7253 455/418 |
| 2010/0273845 | A1 | 11/2010 | Alsina et al. | |
| 2014/0073255 | A1 | 3/2014 | Kuscher et al. | |
| 2014/0080494 | A1* | 3/2014 | Lim | H04W 72/042 455/450 |
| 2014/0199969 | A1* | 7/2014 | Johnsson | H04W 56/00 455/411 |
| 2014/0206346 | A1* | 7/2014 | Kiukkonen | H04W 52/0229 455/426.1 |
| 2014/0213186 | A1 | 7/2014 | Gage et al. | |
| 2014/0357269 | A1* | 12/2014 | Zhou | H04W 76/14 455/434 |
| 2016/0050281 | A1* | 2/2016 | Jain | H04L 67/141 726/7 |
| 2016/0314453 | A1* | 10/2016 | Rogers | G06Q 20/327 |

OTHER PUBLICATIONS

International Search Report and Written Opinion of PCT/SE2015/051319 dated Mar. 30, 2016, all enclosed pages cited.

Chapter II International Preliminary Report on Patentability of PCT/SE2015/051319 dated Mar. 23, 2017, all enclosed pages cited.

* cited by examiner

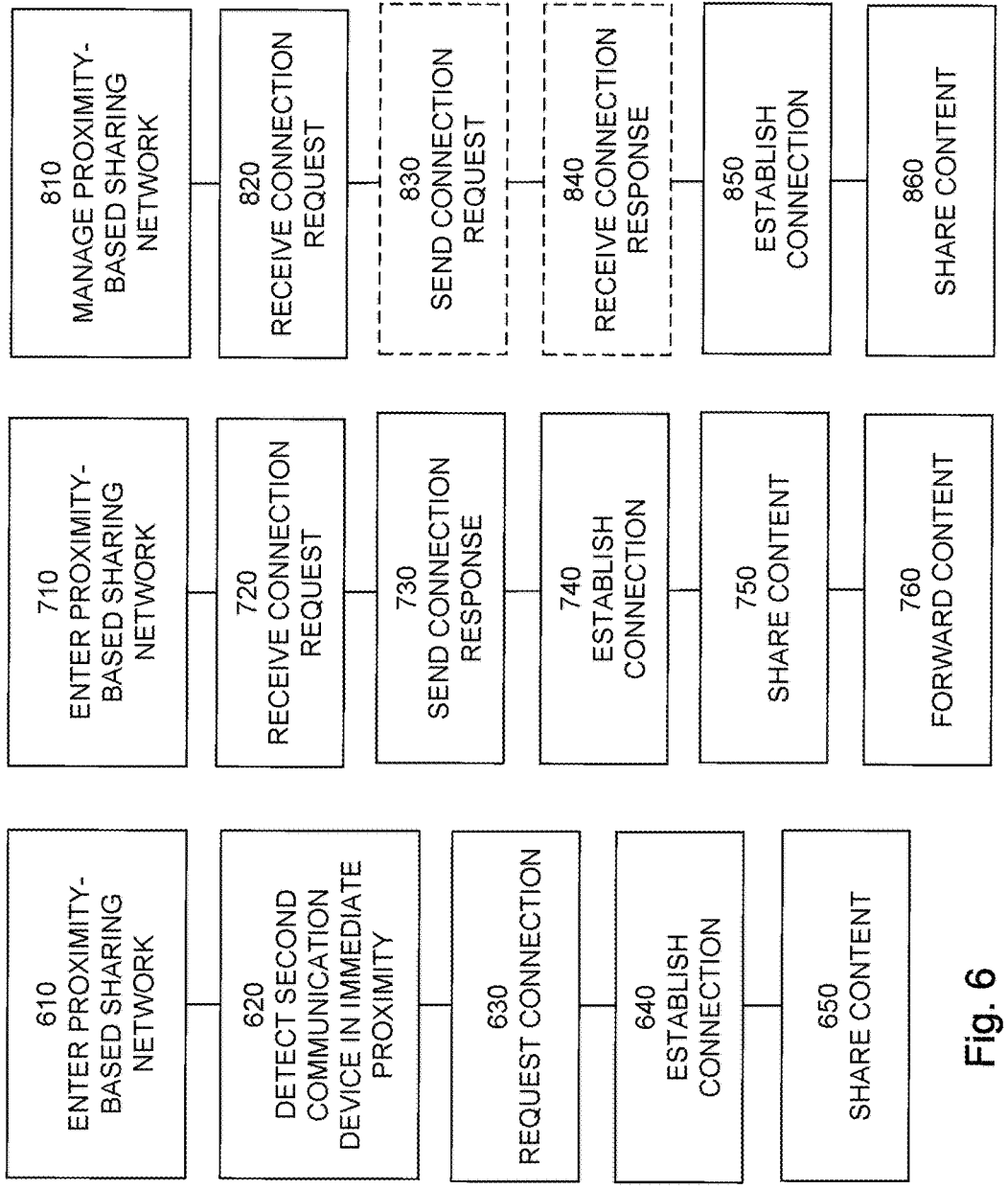

COMMUNICATION DEVICE FOR IMPROVED ESTABLISHING OF A CONNECTION BETWEEN DEVICES

TECHNICAL FIELD

This application relates to a method, a computer-readable medium and a communication device, such as a mobile communications terminal, for improved establishing of a connection between devices, and in particular for establishing a sub group in a sharing network.

BACKGROUND

When sharing content, such as images or sound, a connection with a device to share to have to be established. To establish this connection the receiving device has to be identified often manually by the sending device, and the connection be accepted. Also the manner of sharing the content has to be established. Furthermore, as content is shared, using contemporary techniques where the sender only takes a few actions, the receiving side has to perform actions to retrieve the shared content. This requires many user actions on both the sending party and the receiving party's end, and especially so if the content is to be shared with more than one user.

The problem occurs especially when a sharing is to be performed with someone that one has not shared content with before.

Furthermore, if sub groups within a sharing network is to be established, further actions would have to be taken thereby requiring further user actions.

Simplified sharing manners have been proposed, however, these are always through a third party necessitating that the receiving user go and retrieve the shared content from the third party.

There is thus a need for an improved manner of sharing content requiring a minimum of user actions, both on the sender side and on the receiver side.

SUMMARY

The inventors of the present invention have realized, after inventive and insightful reasoning that by utilizing for example beacon technologies for detecting other communication devices in the proximity, a sharing network may be generated automatically. Taking advantage of the simplicity of this, the content may be shared seamlessly and effortlessly with a minimum of user actions, even to a large number of receivers and also with receivers that one has previously not communicated with. The recipients of content to be shared will simply be all devices part of the sharing network.

The beacon technologies are often short range thereby limiting the sharing to those communication devices that are in close proximity to a user. This enables a use similar to sharing printed photographs, where one shows the photographs to those that are nearby. Also, a recipient will be provided with shared content without taking any action— apart from possibly accepting the content (for example through a prompt or by activating a link). The recipient will thus no longer have to establish a connection or to go out on various social media to search for the content to be shared.

This provides an elegant and effortless manner of sharing content almost automatically requiring a minimum of user actions, by automatically sensing the presence of other devices in the proximity, establishing a sharing network proactively and automatically, whereby a user only needs to perform one user input to share the content with many receivers. Likewise, no action (apart from a possible confirmation or acceptance) is required by the receivers.

Furthermore, the inventors have realized that by utilizing the signal strengths of the low power beacon technologies (or similar technologies), it is possible to determine a more precise proximity or distance to another device. The inventors have realized that this may be used to specify or form a subgroup, possibly consisting of only two devices/users, by establishing a connection or pairing between two devices that are placed in immediate proximity to one another. The connection or pairing may be temporary while the devices remain in immediate proximity to one another. The connection or pairing may be temporary while the devices remain in a proximity-based sharing network. The connection or pairing may be permanent in that it continues to exist even when the devices are not in the same proximity. Such a connection or pairing may then be maintained through a long range communication technology such as LTE (Long Term Evolution) or other cellular communication technology.

It is an object of the teachings of this application to overcome the problems listed above by providing a communication device being part of a proximity-based sharing network, said communication device comprising a controller and a radio frequency interface, wherein the controller is configured to detect that a second communication device is in an immediate proximity and in response thereto automatically establishing a connection for sharing content.

In one embodiment the controller is further configured to detect that said second communication device is in an immediate proximity using a short-range communication interface and establish said connection over a long-range communication interface.

In one embodiment, the communication device is a mobile communications terminal such as a tablet computer, a smartphone or a laptop computer. In one embodiment, the communication device is a game console. In one embodiment, the communication device is a media device such as a music and/or video playing device.

In one embodiment the content to be shared is related to a social media.

In one embodiment the connection is a social media connection.

It is also an object of the teachings of this application to overcome the problems listed above by providing a communication device comprising a controller and a radio frequency interface, wherein the controller is configured to detect that a second communication device is in an immediate proximity and in response thereto automatically establishing a social media connection.

It is also an object of the teachings of this application to overcome the problems listed above by providing a receiving communication device being part of a proximity-based sharing network, said communication device comprising a controller and a radio frequency interface, wherein the controller is configured to receive a connection request; send a connection response, whereupon a connection is established; receive content to be shared through said connection.

It is also an object of the teachings of this application to overcome the problems listed above by providing a server configured to manage a proximity-based sharing network, said server comprising a controller being configured to receive a connection request from a first communication device, said connection request carrying an identifier for a second communication device and establish a connection between the first communication device and the second communication device, wherein the connection is established over a long-range communication interface.

It is also an object of the teachings of this application to overcome the problems listed above by providing a method for use in a communication device being part of a proximity-based sharing network, said communication device comprising a controller and a radio frequency interface, wherein the method comprises: detecting that a second communication device is in an immediate proximity and in response thereto automatically establishing a connection for sharing content.

In one embodiment the method further comprises detecting that said second communication device is in an immediate proximity using a short-range communication interface and establishing said connection over a long-range communication interface.

It is also an object of the teachings of this application to overcome the problems listed above by providing a method for use in a receiving communication device being part of a proximity-based sharing network, said method comprising: receiving a connection request; sending a connection response, whereupon a connection is established; receiving content to be shared through said connection.

It is also an object of the teachings of this application to overcome the problems listed above by providing a method for use in a server configured to manage a proximity-based sharing network, said method comprising receiving a connection request from a first communication device, said connection request carrying an identifier for a second communication device and establishing a connection between the first communication device and the second communication device, wherein the connection is established over a long-range communication interface.

It is also an object of the teachings of this application to overcome the problems listed above by providing a method for use in a communication device comprising a controller and a radio frequency interface, wherein the method comprises detecting that a second communication device is in an immediate proximity and in response thereto automatically establishing a social media connection.

It is a further object of the teachings of this application to overcome the problems listed above by providing a computer readable medium comprising instructions that when loaded into and executed by a controller, such as a processor, cause the execution of a method according to herein.

The teachings herein find use in devices having user interfaces such as mobile phones, smart phones, tablet computers, laptop computers, gaming consoles and media and other infotainment devices.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

FIG. 6 shows a flowchart illustrating a general method for use in a sharing communication device according to an embodiment of the teachings herein;

FIG. 7 shows a flowchart illustrating a general method for use in a receiving communication device according to an embodiment of the teachings herein; and FIG. 8 shows a flowchart illustrating a general method for use in a server according to an embodiment of the teachings herein.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1A:
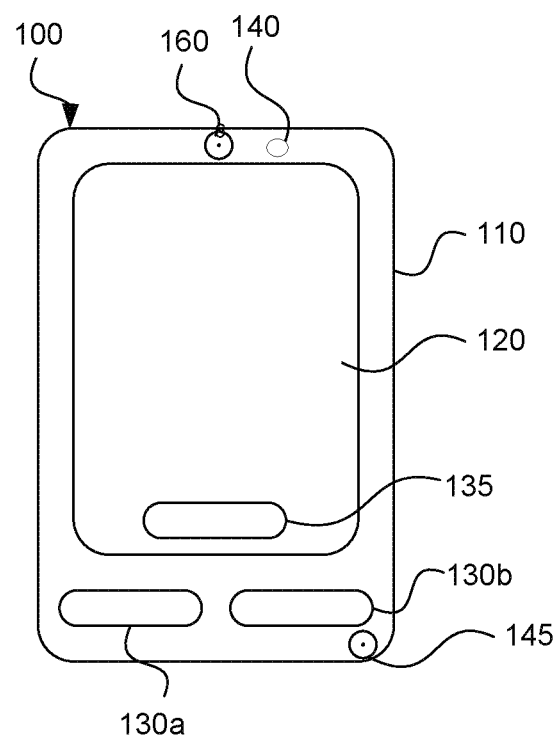
FIGS. 1A and 1B are schematic views of each a communication device according to the teachings herein.
Figure 1B:
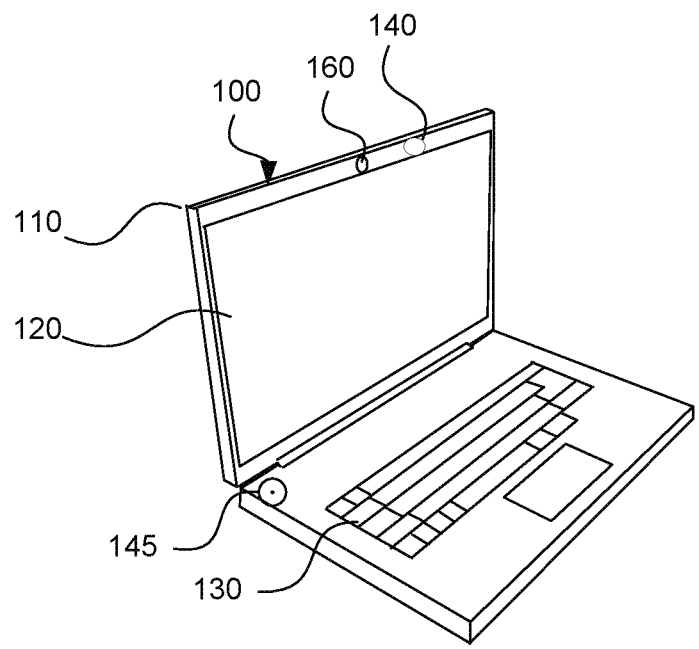

FIG. 1 generally shows a communication device 100 according to an embodiment herein. In one embodiment the communication device 100 is configured for wireless network communication. Examples of a communication device 100 are: a laptop computer, a tablet computer, a mobile communications terminal such as a mobile telephone or a smart phone, a personal digital assistant and a game console. Such examples are portable. Other examples may include a desktop computer or computer integrated display. Two embodiments will be exemplified and described as being a smartphone in FIG. 1A, a laptop computer 100 in FIG. 1B as an example of a computer and a tablet computer.

Referring to FIG. 1A a mobile communications terminal in the form of a smartphone 100 or a tablet computer 100 (arranged with a wireless communication interface) comprises a housing 110 in which a display 120 is arranged. In one embodiment the display 120 is a touch display. In other embodiments the display 120 is a non-touch display. Furthermore, the smartphone 100 comprises two keys 130a, 130b. In this embodiment there are two keys 130, but any number of keys is possible and depends on the design of the smartphone 100. In one embodiment the smartphone 100 is configured to display and operate a virtual key 135 on the touch display 120. It should be noted that the number of virtual keys 135 are dependant on the design of the smartphone 100 and an application that is executed on the smartphone 100. The smartphone 100 is also equipped with a camera 160. The camera 160 is a digital camera that is arranged to take video or still photographs by recording images on an electronic image sensor (not shown). In one embodiment the camera 160 is an external camera. In one embodiment the camera is alternatively replaced by a source providing an image stream. The smartphone 100 may also be equipped with a loud speaker 140 and a microphone 145.

Referring to FIG. 1B a laptop computer 100 comprises a display 120 and a housing 110. The housing comprises a controller or CPU (not shown) and one or more computer-readable storage mediums (not shown), such as storage units and internal memory. Examples of storage units are disk drives or hard drives. The laptop computer 100 further comprises at least one data port. Data ports can be wired and/or wireless. Examples of data ports are USB (Universal Serial Bus) ports, Ethernet ports or WiFi (according to IEEE standard 802.11) ports. Data ports are configured to enable a laptop computer 100 to connect with other communication devices or a server.

The laptop computer 100 further comprises at least one input unit such as a keyboard 130. Other examples of input units are computer mouse, touch pads, touch screens or joysticks to name a few.

The laptop computer 100 is further equipped with a camera 160. The camera 160 is a digital camera that is arranged to take video or still photographs by recording images on an electronic image sensor (not shown). In one embodiment the camera 160 is an external camera. In one embodiment the camera is alternatively replaced by a source providing an image stream.

The laptop computer 100 may also be equipped with a loud speaker 140 and a microphone 145.

Figure 2:
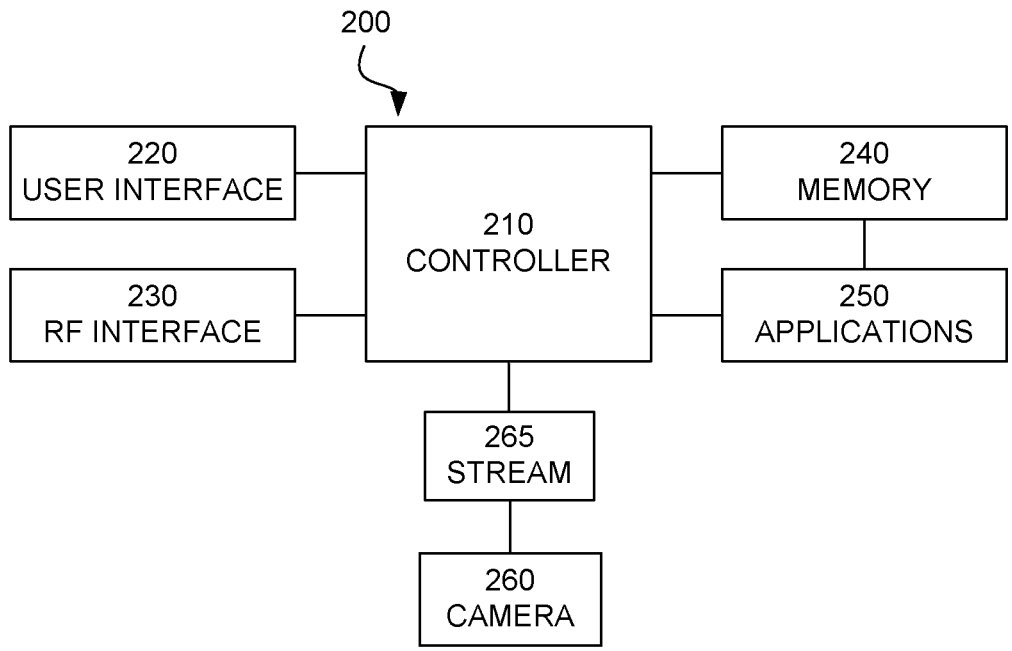
FIG. 2 is a schematic view of the components of a communication device according to the teachings herein.

FIG. 2 shows a schematic view of the general structure of a communication device according to FIG. 1. The device 100 comprises a controller 210 which is responsible for the overall operation of the communication device 200 and is preferably implemented by any commercially available CPU ("Central Processing Unit"), DSP ("Digital Signal Processor") or any other electronic programmable logic device. The controller 210 is configured to read instructions from the memory 240 and execute these instructions to control the operation of the communication device 100. The memory 240 may be implemented using any commonly known technology for computer-readable memories such as ROM, RAM, SRAM, DRAM, CMOS, FLASH, DDR, SDRAM or some other memory technology. The memory 240 is used for various purposes by the controller 210, one of them being for storing application data and program instructions 250 for various software modules in the communication device 200. The software modules include a real-time operating system, drivers for a user interface 220, an application handler as well as various applications 250.

The communication device 200 further comprises a user interface 220, which in the communication device of FIGS. 1A and 1B is comprised of the display 120 and the keys 130, 135. The user interface may also comprise the microphone 145 and the loudspeaker 144. The microphone and the loudspeaker may be arranged to form a group as has been disclosed in the Swedish patent application SE 1450293-4.

The communication device 200 may further comprises a radio frequency interface 230, which is adapted to allow the communication device to communicate with other devices through a radio frequency band through the use of different radio frequency technologies. Examples of such technologies are short-range standards IEEE 802.11, IEEE 802.15, ZigBee, WirelessHART, WIFI and Bluetooth® and long-range standards W-CDMA/HSPA, GSM, UTRAN and LTE to name a few. It should be noted that, as is commonly known, the radio frequency interface is arranged to communicate according to more than one technology and many different combinations exist, for example a smartphone is commonly arranged to communicate according to the Bluetooth™ standard, the WiFi standard and the LTE standard. The radio frequency interface is arranged to communicate over a short-range communication technology and to communicate over a long-range communication technology.

The radio frequency interface 230 may be arranged to operate as a beacon, for example utilizing the iBeacon™ technology.

The radio frequency interface 230 may thus be configured to detect how close another communication device is, where the proximity is specified to be within three different ranges immediate (a few centimeters), near (a few meters) and far (farther than 10 meters). The same ranging may be accomplished using another RF technology by sensing and categorizing different received signal strength levels. Such signal levels can be determined based on the RSSI (Received Signal Strength Indicator) for example.

The communication device 200 is further equipped with a camera 260. The camera 260 is a digital camera that is arranged to take video or still photographs by recording images on an electronic image sensor (not shown).

The camera 260 is operably connected to the controller 210 to provide the controller with a video stream 265, i.e. the series of images captured, for further processing possibly for use in and/or according to one or several of the applications 250.

In one embodiment the camera 260 is an external camera or source of an image stream.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 3:
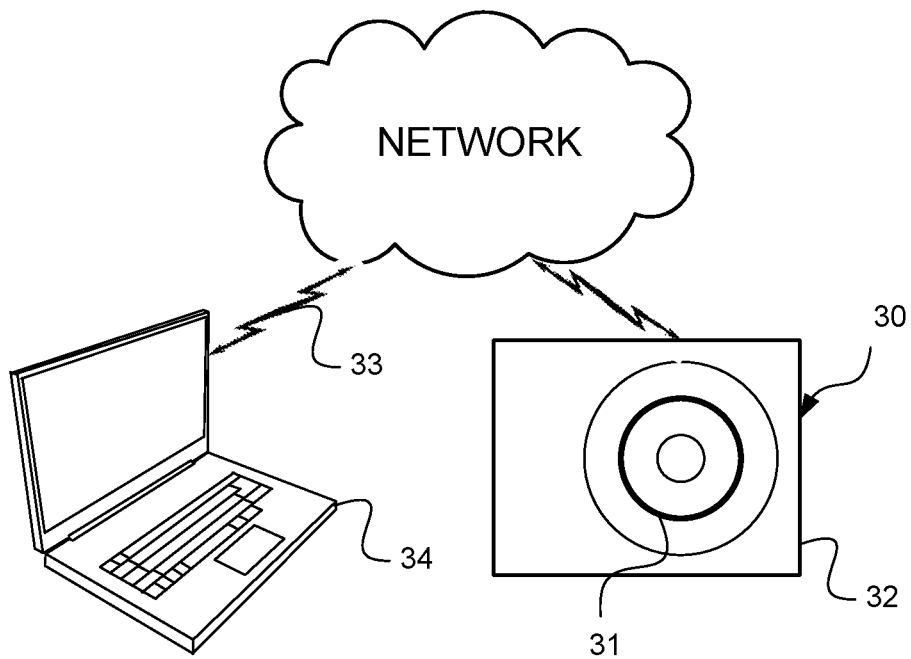
FIG. 3 is a schematic view of a computer-readable memory according to the teachings herein.

FIG. 3 shows a schematic view of a computer-readable medium as described in the above. The computer-readable medium 30 is in this embodiment a data disc 30. In one embodiment the data disc 30 is a magnetic data storage disc. The data disc 30 is configured to carry instructions 31 that when loaded into a controller, such as a processor, executes a method or procedure according to the embodiments disclosed above. The data disc 30 is arranged to be connected to or within and read by a reading device 32, for loading the instructions into the controller. One such example of a reading device 32 in combination with one (or several) data disc(s) 30 is a hard drive. It should be noted that the computer-readable medium can also be other mediums such as compact discs, digital video discs, flash memories or other memory technologies commonly used.

The instructions 31 may also be downloaded to a computer data reading device 34, such as a laptop computer or other device capable of reading computer coded data on a computer-readable medium, by comprising the instructions 31 in a computer-readable signal 33 which is transmitted via a wireless (or wired) interface (for example via the Internet) to the computer data reading device 34 for loading the instructions 31 into a controller. In such an embodiment the computer-readable signal 33 is one type of a computer-readable medium 30.

The instructions may be stored in a memory (not shown explicitly in FIG. 3, but referenced 240 in FIG. 2) of the laptop computer 34.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Examples of improved manners for establishing a sharing network for sharing content between two or more communication devices has been disclosed in the Swedish patent applications SE 1451203-2 and SE 1400535-9, which disclose how a proximity-based sharing network may be established for communication devices being in close proximity to one another.

In one example a communication device is configured to: identify at least one receiving communication device and establishing a connection with the at least one receiving communication device thereby establishing a sharing network; present content; receive a user input indicating a share; and share the content, wherein the communication device is further configured to identify the receiving communication device by being configured to detect a presence of the receiving communication device; and establish the connection with the receiving communication device automatically.

In one example a method is provided for establishing a dynamic, proximity-based group of wireless communication devices to support potential interaction between a user of a first wireless communication device and one or more users of the wireless communication devices in the dynamic, proximity-based group. In the method, the first wireless communication device sends a short-range wireless beacon broadcast message to other wireless communication devices in a proximity zone around the first wireless communication device. The short-range wireless beacon broadcast message is adapted for requesting the other wireless communication devices to send a response message to a server or to the first wireless communication device. The server or the first wireless communication device registers responding devices among the other wireless communication devices. The first wireless communication device communicates with the server to enable the user of the first wireless communication device to interact selectively with one or more of the users of the registered wireless communication devices, wherein said one or more users are less than all users of the registered wireless communication devices.

Details for how the proximity-based sharing network may be established are to be found in the two Swedish patent applications noted above and further details will not be given herein, but a reader is asked to look at the two Swedish patent applications noted above.

A manner of establishing a further connection between two communication devices in such a sharing network will be disclosed below with reference to the accompanying figures. The examples will be illustrated focusing on the gestures made and the resulting content sharing, but it should be clear that the processing is performed in part or fully in a communication device comprising a controller as disclosed above with reference to FIGS. 1 and 2 or caused to be performed by executing instructions stored on a computer-readable medium as disclosed with reference to FIG. 3.

Figure 4:
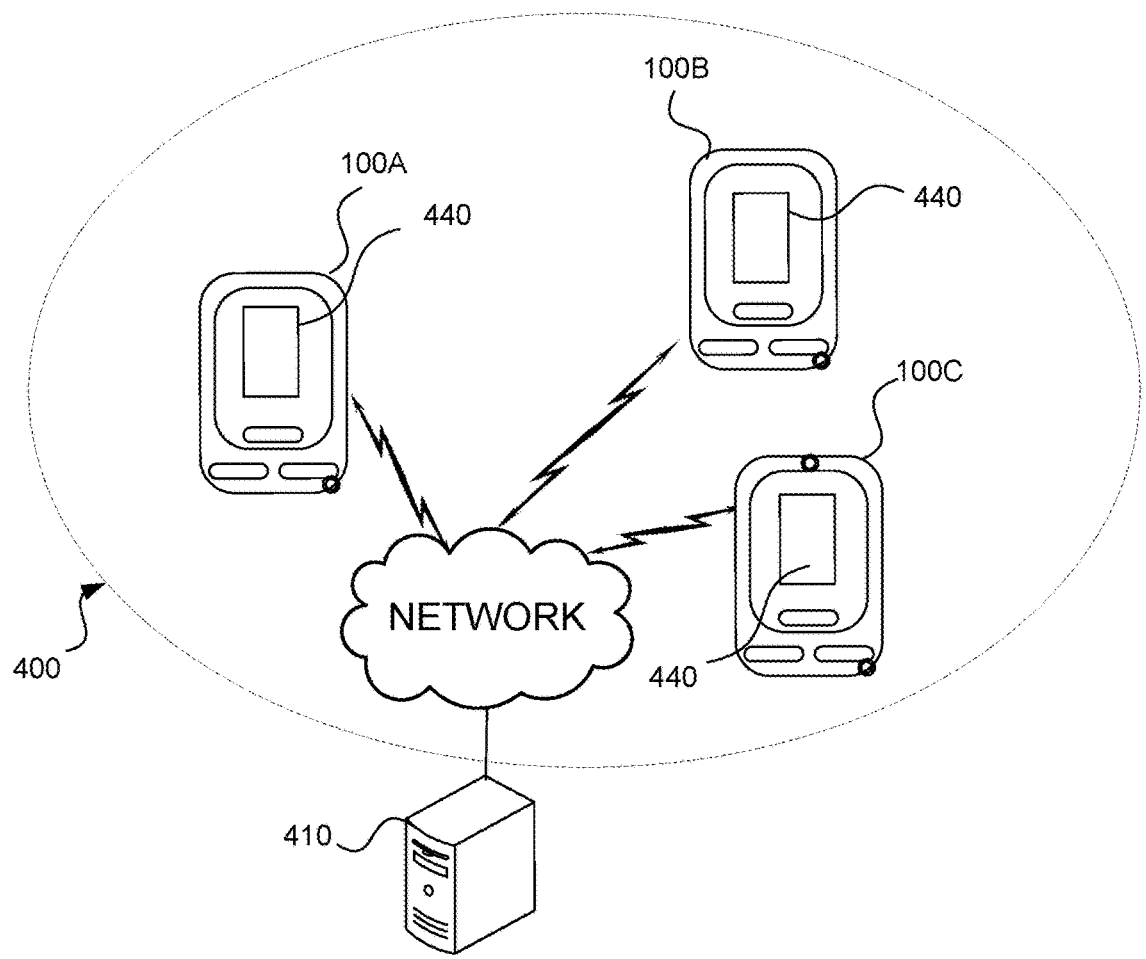
FIG. 4 shows an example embodiment of establishing a sharing network according to the teachings herein.

FIG. 4 shows an example of a proximity-based (sharing) network 400 comprising at least one communication device 100 such as in FIG. 1 and FIG. 2. In the example of FIG. 4, the p-b sharing network 400 comprises a first communication device 100A which is connected to a second and a third communication device 100B and 100C respectively. The connection is established through a Bluetooth or WiFi connection or it may simply be a virtual connection indicating that the first communication device 100A and the third communication device 100C are aware of the other's presence and identity so that a connection can be quickly established as needed.

In one embodiment the proximity-based sharing network is established through the use of iBeacon™ technology.

The proximity-based sharing network 400 is established in such a manner that as a second communication device 100B comes into range of or in close proximity to the first communication device 100A, the first communication device 100A is configured to detect the presence of the second communication device 100B. The range may be determined by a short range communication standard being used. The presence may be announced by the first communication device 100A and the second communication device 100B emitting (Bluetooth) broadcast messages that are intercepted by the other communication devices. As part of the identifying the first communication device receives an identifier for the second communication device.

In FIG. 4, the proximity-based sharing network is indicated with a dashed oval. While a communication device 100 is within the proximity-based sharing network it may partake in content 440 that is shared. As is indicated in FIG. 4, content that is displayed on the first communication device 100A is also shared with the second and third communication device 100B and 100C. Naturally, the content to be shared may be selected by a user of the communication device or an application running on a communication device.

In one embodiment the content 440 is an image or video file and the manner of presenting the content 440 is to display the content 440. In one embodiment the content 440 is a music or sound file and the manner of presenting the content 440 is to play the content 440. In one embodiment the content 440 is a playlist file and the manner of presenting the content 440 is to play and/or display a media file being included in the playlist. In one embodiment the content 440 is a word processing file, a spreadsheet file, a presentation file or other data file and the manner of presenting the content 440 is to display the graphical representation of the content 440.

The content 440 may also be related to contacts and/or other social media information. In such an embodiment, a social media connection may thus be established by simply brining the two devices in close proximity of one another, possibly after a connection mode has been established on one or both of the devices.

As can be seen the proximity-based sharing network is maintained through a server 410 being connected to the communication devices 100 through a network connection, such as an internet connection and/or a cellular connection, such as through LTE. The communication over the proximity-based sharing network 400 is shown with zig-zagged arrows. The low-power communication technology is thus only used to detect a proximity to another communication device and while the actual proximity-based sharing network is maintained through a long range connection, often having a higher data speed traffic. However, the proximity-based sharing network 400 may also be maintained through peer-to-peer communication.

It should be noted that even though the illustration of FIG. 4 only indicate a connection between the first communication device 100A and the second communication device 100B and a connection between the first communication device 100A and the third communication device 100C, there could also be a connection between the second communication device 100B and the third communication device 100C and also between other communication devices.

Figure 5A:
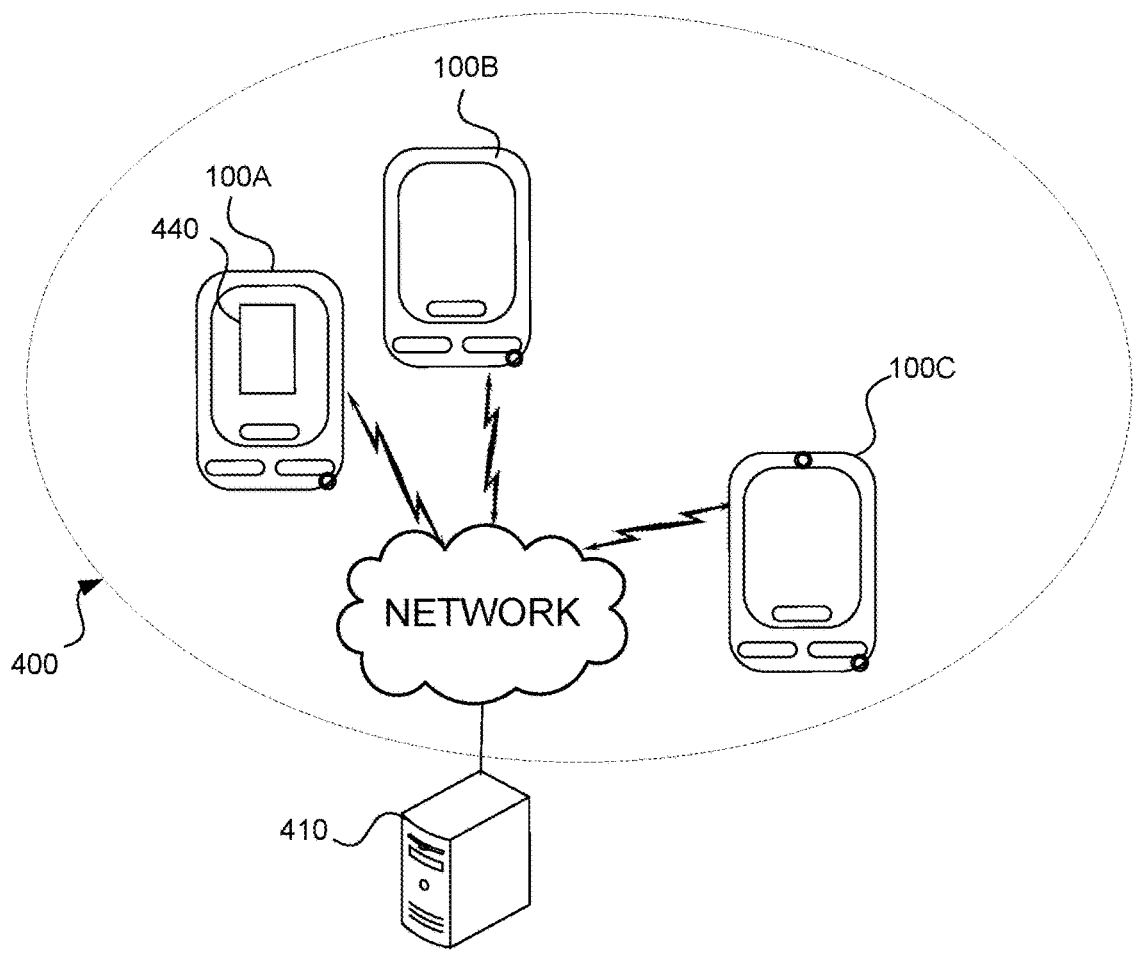
FIGS. 5A, 5B, 5C, 5D and 5E each shows an example embodiment of sharing in a sharing network according to the teachings herein.

FIG. 5A shows an illustration of a first communication device 100A being part of a sharing network 400 as in FIG. 4, being connected to a second communication device 100B and a third communication device 100C. The second communication device 100B is brought in immediate proximity to the first communication device 100A and the first communication device 100A detects that the second communication device 100B is in immediate proximity by, for example, detecting that the signal strength level of any message received from the second communication device 100B is above a threshold level. At substantially the same time, the second communication device 100B detects that the first communication device 100A is in immediate proximity. As this is detected an identifier is transmitted from the second communication device 100B to the first communication device 100A. The identifier may be part of the broadcast message being transmitted and by which a communication device 100 detects that another communication device 100 is in immediate proximity. This may be achieved by utilizing iBeacon technology.

The identifier may be based on an IMEI (International Mobile Equipment Identifier), an IMSI (International Mobile Subscription Identifier), a MAC address (Media Access Control), a phone number, a social media identifier, an IP address (Internet Protocol) or other (unique) identifier. The identifier may also or alternatively be based on an identifier used in the proximity-based sharing network 400.

The identifier may be financial account identifiers. The identifier may be related to the financial accounts associated with the user of the communication device 100. For example, the identifier may be based on a financial (e.g., bank) account number, or a financial account related identifier such as a Swish number. In some embodiments the financial account related identifier is an account identifier based on a phone number. Due to the nature of financial accounts the identifier may be an identifier which is private. However, in some cases, such as the case of a telephone number or Swish number the identifier may be public. A private identifier is only accessible to devices which are trusted. A public identifier may be accessible to both trusted and unknown devices. Determining whether a device is trusted may be performed via accessing the server 410. For example, the first communication 100A may request from the server 410 a private identifier associated with the second communication device 100B. The server 410 can thereafter transmit the private identifier to the first communication device 100A. In some embodiments the server 410 may communicate with a separate application server to access or retrieve the private identifier.

The identifier of the second communication device 100B is stored by the first communication device 100A and a connection is established between the two communication devices 100A and 100B.

The connection may be established by the first communication device 100A sending a connection request to the server 410 for establishing a connection with the second communication device 100B. The connection may also be established by the second communication device 100B sending a connection request to the server 410 for establishing a connection with the first communication device 100A. The server 410 then establishes the connection and sends a connection response to the other communication device 100. Possibly, the server 410 sends a connection request to the other communication device 100 to which the other communication device 100 returns an acknowledgement of. If the connection request is not acknowledged or accepted, the server 410 does not establish the connection.

The server 410 can be accessible via the long-range communication interface. The server 410 may be inaccessible over the short-range communication interface.

Alternatively or additionally, the first communication device 100A sends a connection request to the second communication device 100B. If the connection request is accepted, the first communication device 100A establishes a peer-to-peer connection to the second communication device 100B. The peer-to-peer connection may be made over a short-range communication interface. In such a case, the connection may constitute for example a Bluetooth pairing. The peer-to-peer connection may be made over a long-range communication interface.

As the first and second communication devices 100 are connected they may form a sub network for immediate sharing of content which is not shared with other communication devices 100 in the proximity-based sharing network. Alternatively or additionally, an initial sharing is effected as the connection is established wherein contact information and possibly also other content are shared between the first communication device 100A and the second communication device 100B. As part of the initial sharing content that has been selected to be shared may be transferred (or an identifier to the content is transferred).

Figure 5B:
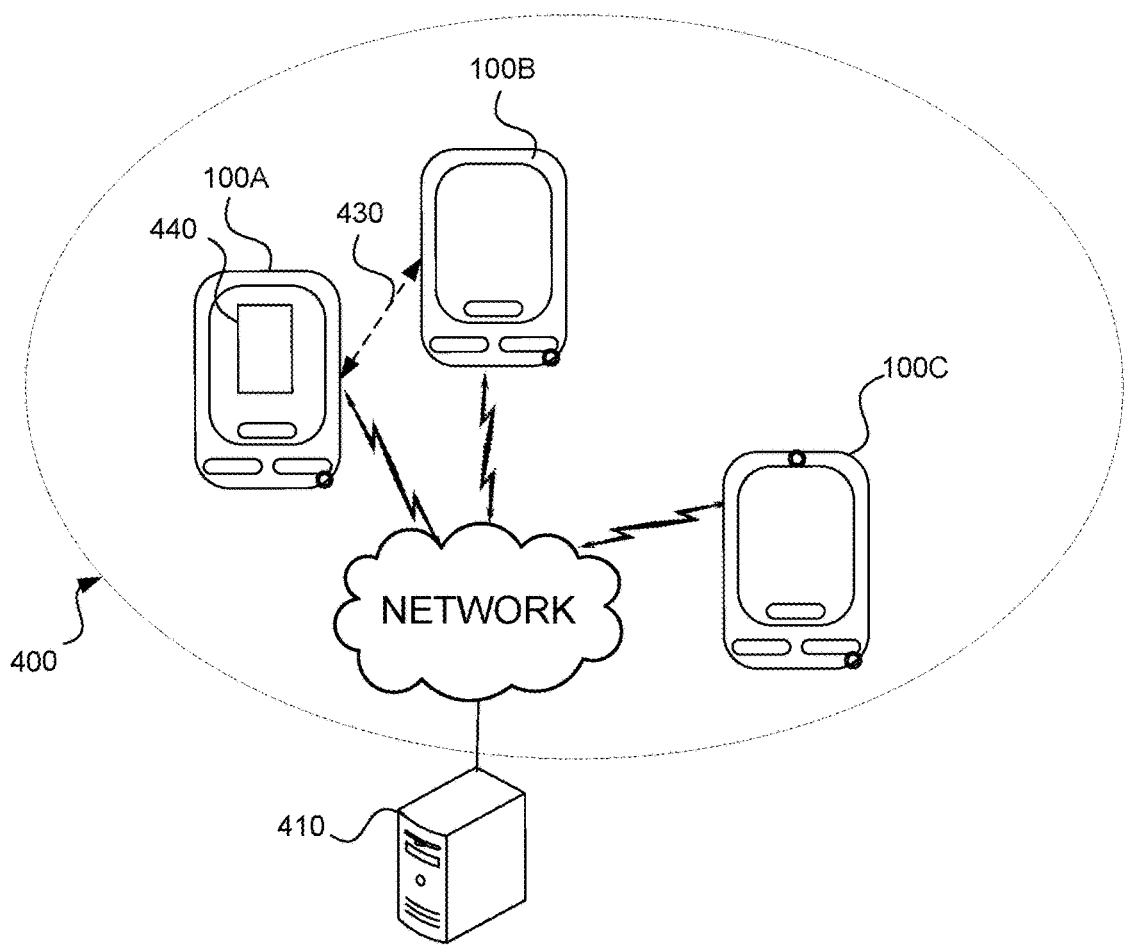

FIG. 5B shows an illustration of the network of FIG. 5A wherein a connection 430 between the first communication device 100A and the second communication device 100B is established and indicated by the dashed arrow. The connection 430 may be a pairing of the two communication devices 100A and 100B.

The connection 430 may be maintained while the initial sharing is effected and then dropped. This enables for easy sharing of content such as exchanging contact information. This also enables for easy acceptance and targeting of content to be shared.

The connection 430 may be maintained for a predetermined time period and then dropped. The time period may be related to a calendar event. This enables for easy targeting and acceptance of content to be shared for a time period such as during a meeting.

The connection 430 may be maintained while the two communication devices 100A and 100B remain in immediate proximity to one another and then dropped. This enables for content to be shared easily while the communication devices 100A and 100B are not moved.

The connection 430 may be maintained while the two communication devices 100A and 100B remain in the same proximity-based sharing network 400 and then dropped. This enables for a sub group to be formed inside a proximity-based sharing network.

The connection 430 may be maintained also after the second communication device 100B leaves the proximity-based sharing network 400. This enables for easy sharing even after the second communication device 100B has left the proximity-based sharing network and thus enables for a simple and easy pairing of two communication devices 100 to be made. This also enables for a continued membership in the proximity-based sharing network even when the second communication device 100B is no longer in the proximity of the proximity-based sharing network. The connection 430 may be maintained until actively rejected by either the first communication device 100A or the second communication device 100B or both.

Figure 5C:
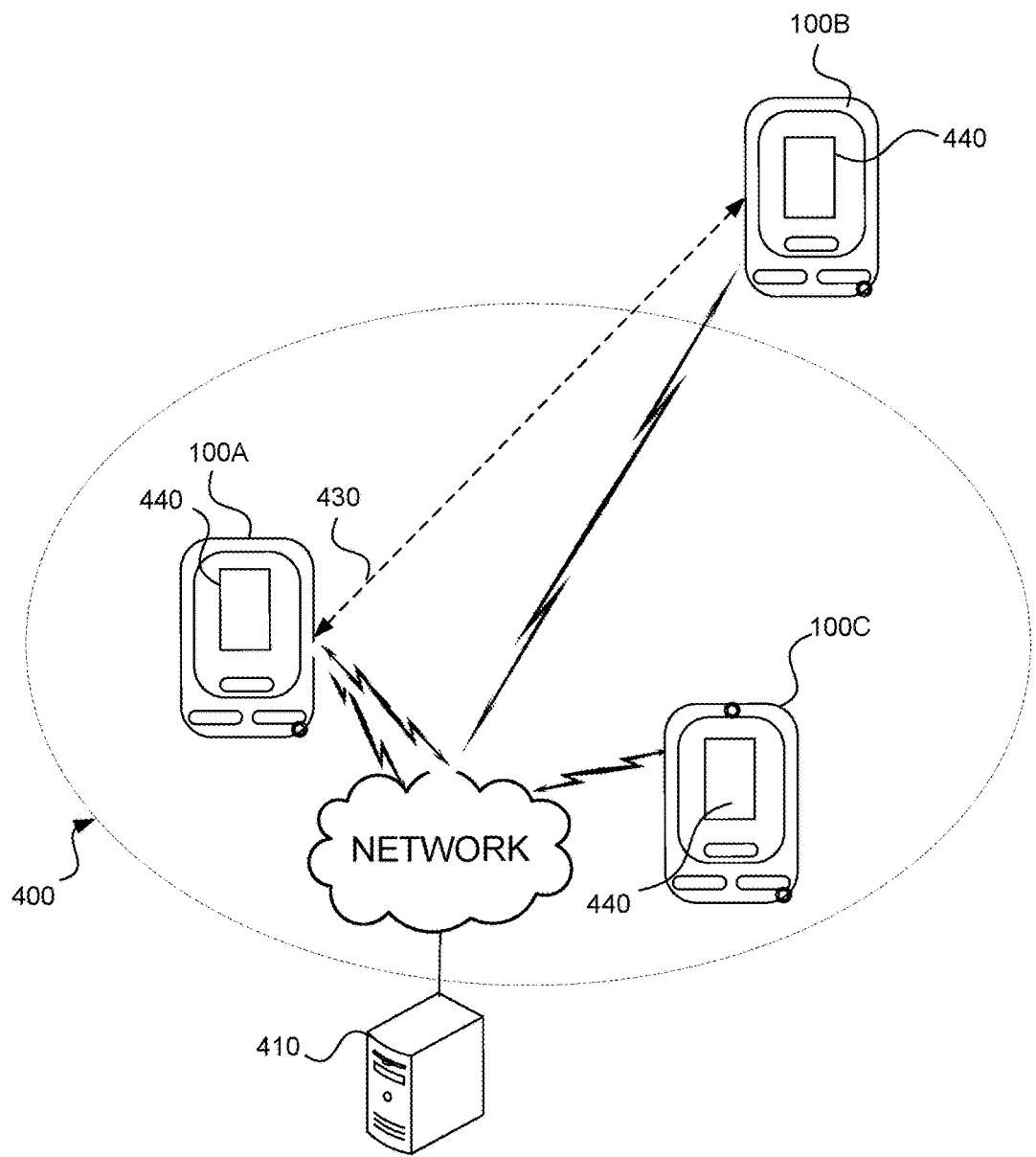

FIG. 5C shows an illustration of the example when the second communication device 100B has left the proximity-based sharing network, but wile the connection 430 is still maintained. In this example both the second communication device 100B and the third communication device 100C receives the same content to be shared 440. The second communication device 100B receives the content 440 through the connection 430, and the third communication device 100C receives the content through the proximity-based sharing network 400. In both cases the sharing is effected through one (or several) server(s) 410. As would be understood, the server 410 may be implemented as one or several servers, and also as an internal or external server(s).

Figure 5D:
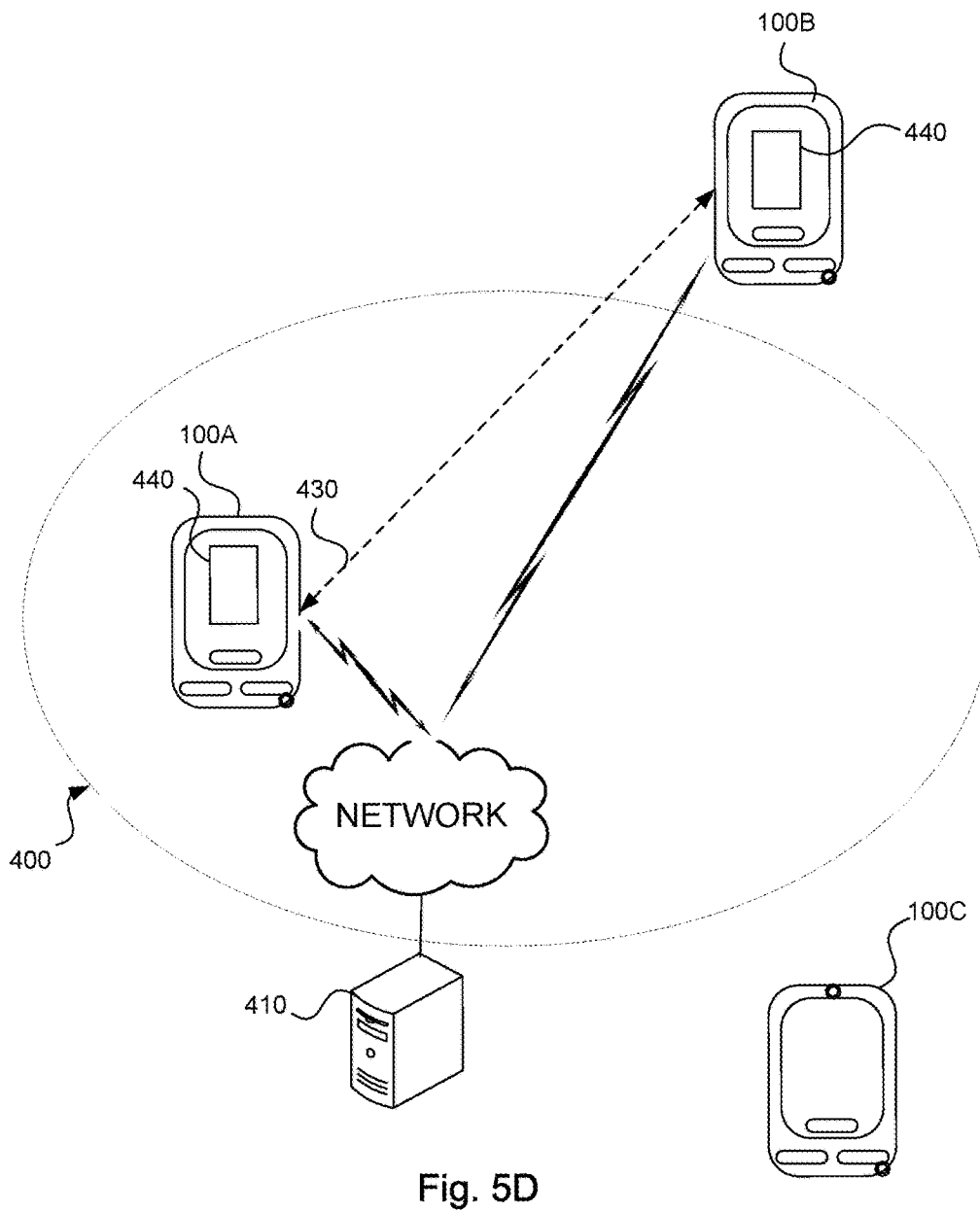

In contrast, should the third communication device 100C leave the proximity-based sharing network, it will no longer receive content to be shared 440. FIG. 5D illustrates an example of this.

Figure 5E:
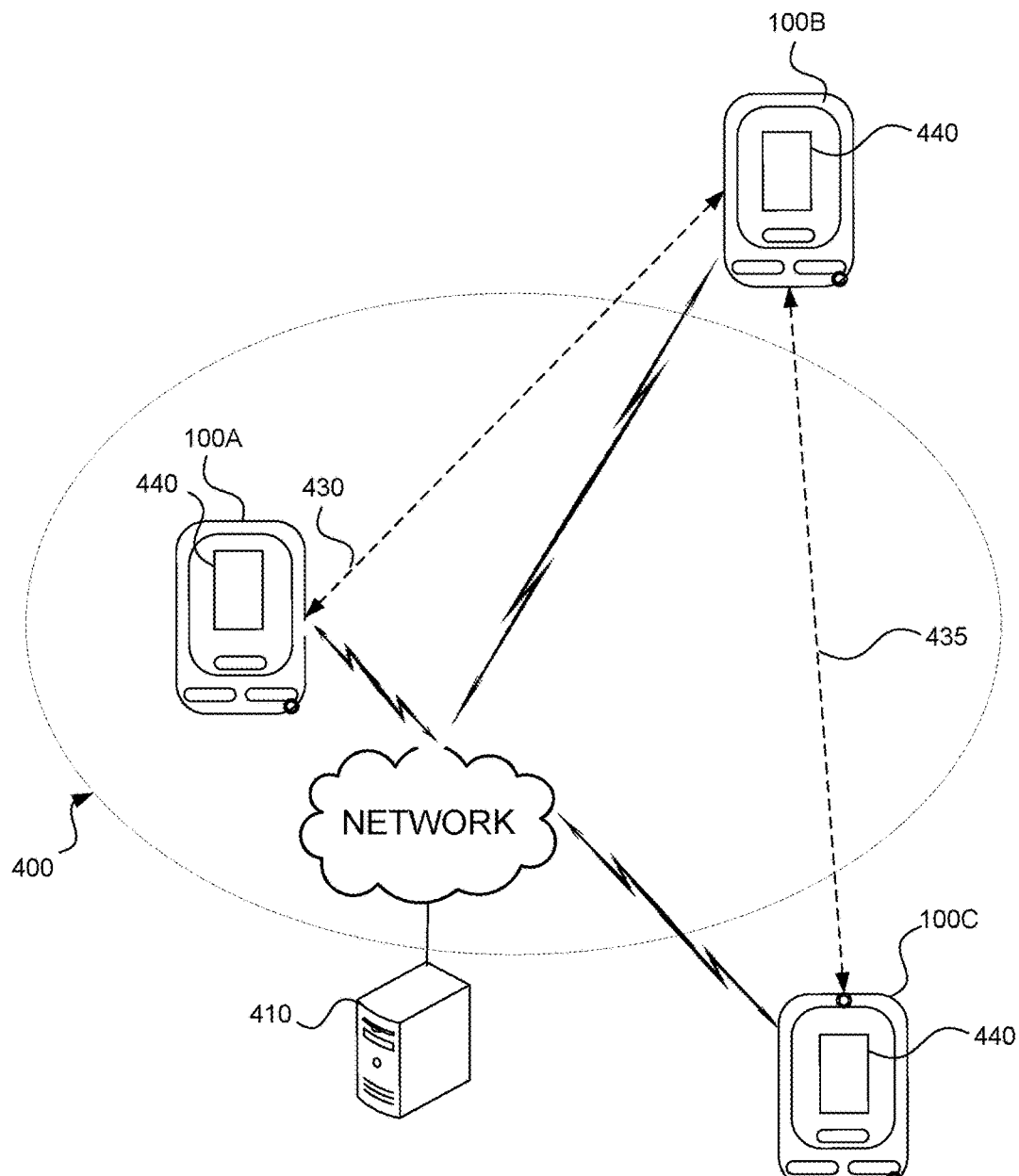

However, should a second connection 435 exist between the second communication device 100B and the third communication device 100C, the content to be shared 440 may be forwarded from the second communication device 100B to the third communication device 100C, thereby enabling for a clustered or cascaded sharing. FIG. 5E illustrates an example of this.

In such an embodiment, a communication device 100B is configured to receive content through a connection 430 from a first communication device 100A and in response thereto, forward the content to another communication device 100C through a second connection 435.

It should be noted that even though the communication is shown as being effected through the server 410, it may also be effected peer-to-peer. Of course, the sharing may also be effected in part by the server, and in part peer-to-peer, such as through the server 410 when sharing between the first and second communication devices 100A and 100B and peer-to-peer when sharing between the third and second communication devices 100C and 100B.

FIG. 6 is a flowchart for a general method for use in a sharing communication device 100A which is configured for establishing 610 or being part of a proximity-based sharing network with at least one receiving communication device 100B. The first communication device 100A detects 620 that a second communication device 100B is in an immediate proximity to the first communication device 100A, and in response thereto sends 630 a connection request. The connection request may carry the identifier of the second communication device 100B. The connection request may be sent to a server 410. The connection request may also or alternatively be sent to the second communication device 100B.

If the connection request is accepted, the connection is established 640 and content may be shared 650.

FIG. 7 is a flowchart for a general method for use in a receiving communication device 100B which is configured for establishing 710 or being part of a proximity-based sharing network with at least one other communication device 100A.

The second communication device 100B receives a connection request 720 and responds 730 with a connection response. If the connection response accepts the connection request, the connection is established 740 and content is shared 750.

The second communication device 100B may also forward 760 content to be shared received through a first connection 430 from a first communication device 100A to a third communication device 100C through a second connection 435.

FIG. 8 is a flowchart for a general method for use in a server handling or managing 810 a proximity-based sharing network with at least two communication devices 100A, 100B.

The server 410 receives 820 a connection request from the first communication device 100A and possibly sends 830 a connection request to the second communication device 100B. The server then possibly receives 840 a connection response from the second communication device 100B and then establishes a connection is established 850 for sharing content 860. Alternatively, the server 410 establishes the connection directly as the connection request is received from the first communication device 100A. Also alternatively, the server 410 establishes the connection directly as the connection request is received from the first communication device 100A and a connection request is received from the second communication device 100B.

In some embodiments the content to be shared may be identifiers related to financial accounts. In such embodiments the connection may be related to the transfer of funds.

In one such embodiment the connection to be established is a connection for the transferring of funds, for example, from an account associated with a user of the first communication device 100A to or from a user of the second communication device 100B. To establish such a connection for future transactions, the first and/or the second communication device may first be set to a funds-connection-establishing mode, for example, by activating a funds-transfer application or a feature within such an application. This ensures that the users are aware that a connection for transfer of funds is to be established. The users are then trusting the financial applications safeguards to prevent unintentional transfers. In one embodiment the first communication device 100A is set to the funds-connection-establishing mode. As shown in FIG. 5, as the second communication device 100B is brought in immediate proximity to the first communication device 100A, the first communication device 100A detects that the second communication device 100B is in immediate proximity and sends a connection request. The connection request may be sent to a server 410. The connection request may include a funds-connection-establishing request. Prior to transmitting the connection request the second communication device 100B may have sent an account identifier to the first communication device 100A, for example, a telephone number or a bank account number. After the establishment of the connection, a funds transfer can be initiated or completed. If the funds-connection-establishing is initiated the first communication device 100A or the second communication device 100B may prompt for approval by the user.

In one such embodiment the connection to be established is an automatic connection for the transferring of funds. For example, from an account associated with a user of the first communication device 100A to or from a user of the second communication device 100B. In such a transfer the first and second communication device may first be set to a funds-transfer mode, for example, by activating a funds-transfer application. This ensures that the users are aware that a transfer of funds may take place. In one embodiment the first communication device 100A is set to a funds-transfer mode, an amount to be transferred is also determined, for example, through entry by the user. As shown in FIG. 5, as the second communication device 100B is brought in immediate proximity to the first communication device 100A, the first communication device 100A detects that the second communication device 100B is in immediate proximity and sends a connection request. The connection request may be sent to a server 410. The connection request may include a transfer of funds request. Prior to transmitting the connection request the second communication device 100B may have sent an account identifier to the first communication device 100A, for example, a telephone number or a bank account number. On the establishment of a connection, or in some cases shortly thereafter, a funds transfer can be initiated or completed. If the funds transfer is initiated the first communication device 100A or the second communication device 100B may prompt for approval by the user.

As described above the content to be shared may include identifiers related to financial accounts. It is also clear from the above that the content to be shared may also include other data related to the transfer of funds, for example, the content may include approval requests, receipts of transactions, invoices etc.

As has been indicated above the content to be shared may be related to social media. In one such embodiment the connection to be established is in itself a social media connection. Returning to FIG. 5A, as the second communication device 100B is brought in immediate proximity to the first communication device 100A, the first communication device 100A detects that the second communication device 100B is in immediate proximity and shares a social media request to establish a social media connection. The social media connection is identified by a social media identifier.

In this case, the connection is thus a social media connection between the users of the two communication devices and will also be valid for other communication devices handled or operated by the two users.

This enables for users being in the same proximity-based sharing network to establish social media links quickly and efficiently.

In such an embodiment, the first and second communication devices 100A and 100B need not be part of the same proximity-based sharing network.

The content to be shared may also be contact information, such as a vcard, wherein the two communication devices being in immediate proximity with one another will also be updated to each others phonebook applications.

It should be noted that the connection may thus be formed automatically and also any following sharing of content be performed automatically (or at least with a minimum of user actions), without the user(s) taking any other actions than placing their devices in immediate proximity to one another. This is simple during for example a meeting where all devices may be put in the middle of a table.

A server may be implemented as a communication device 100 such as in FIG. 2.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A communication device (100) being part of a proximity-based sharing network (400), the communication device comprising a controller (210) and a radio frequency interface (230) configured to communicate via short-range communication and long-range internet or cellular communication, wherein the controller is configured to:

detect that a second communication device (100B) is in an immediate proximity to the communication device using short-range communication between the communication device and the second communication device, wherein no further short-range communication between the communication device and the second communication device occurs after the communication device having detected the second communication device using short-range communication;

in response to detecting that the second communication device is in the immediate proximity to the communication device, automatically establish a connection (430) for sharing content between the communication device and the second communication device, wherein the connection is established between the communication device and the second communication device over long-range internet or cellular communication, and wherein the controller of the communication device is configured to send a connection request to a server (410) for causing the server to establish the connection between the communication device and the second communication device, the server not being the communication device nor the second communication device; and share the content between the communication device and the second communication device over long-range internet or cellular communication.

2. The communication device (100) of claim 1, wherein the connection (430) is maintained for a predetermined time period and then dropped.

3. The communication device (100) of claim 1, wherein the connection (430) is maintained while the communication device and the second communication device (100B) remain in immediate proximity to one another.

4. The communication device (100) of claim 1, wherein the connection (430) is maintained while the communication device and the second communication device (100B) remain in the same proximity-based sharing network 400.

5. The communication device (100) of claim 1, wherein the connection (430) is maintained until actively rejected.

6. The communication device (100) of claim 1, wherein the content to be shared is related to a social media.

7. The communication device (100) of claim 6, wherein the connection (430) is a social media connection, and wherein the social media connection is a connection identified by a social media identifier.

8. The communication device according to claim 1, wherein the content to be shared is financial transaction data and the connection is for a transferring of funds, wherein the connection is identified by a financial account identifier.

9. The communication device according to claim 8, wherein the connection is for an automatic transfer of funds.

10. The communication device according to claim 1, wherein the content to be shared is financial transaction data and the connection is for a transferring of funds, wherein the connection is identified by a phone number.

11. The communication device (100) of claim 1, wherein the controller is further configured to drop the connection with the second communication device over long-range internet or cellular communication after a predetermined time period associated with a calendared event for the predetermined period of time period.

12. The communication device (100) of claim 1, wherein the controller is further configured to:

determine that the second communication device is no longer in immediate proximity to the communication device; and in response to determining that the second communication device is no longer in immediate proximity to the communication device, drop the connection with the second communication device over long-range internet or cellular communication.

13. A communication device (100) comprising a controller (210) and a radio frequency interface (230) configured to communicate via short-range communication and long-range internet or cellular communication, wherein the controller is configured to:
    detect that a second communication device (100B) is in an immediate proximity to the communication device using short-range communication between the communication device and the second communication device, wherein no further short-range communication between the communication device and the second communication device occurs after the communication device having detected the second communication device using short-range communication;
    in response to detecting that the second communication device is in the immediate proximity to the communication device, automatically establish a social media connection (430) between the communication device and the second communication device, wherein the social media connection is identified by a social media identifier, wherein the social media connection is established between the communication device and the second communication device over long-range internet or cellular communication, and wherein the controller of the communication device is configured to send a connection request to a server for causing the server (410) to establish the connection between the communication device and the second communication device, the server not being the communication device nor the second communication device; and
    share the content between the communication device and the second communication device over long-range internet or cellular communication.

14. The communication device (100) of claim 13, wherein the communication device is a smartphone or an internet tablet.

15. A communication device (100B) being part of a proximity-based sharing network (400), the communication device comprising a controller (210) and a radio frequency interface (230) configured to communicate via short-range communication and long-range internet or cellular communication, wherein the controller is configured to:
    receive a connection request from a second communication device (100) that is in an immediate proximity to the communication device using short-range communication, wherein no further short-range communication between the communication device and the second communication device occurs after the communication device having detected the second communication device using short-range communication;
    send, in response to the connection request, a connection response to the second communication device using short-range communication and establish a connection (430) for sharing content between the communication device and the second communication device, wherein the connection is established between the communication device and the second communication device over long-range internet or cellular communication; and
    receive content via the connection (430) over long-range cellular communication.

16. A server (410) configured to manage a proximity-based sharing network (400), said server comprising a controller being configured to:
    receive a connection request from a first communication device (100) that sent the connection request in response to the first communication device detecting a second communication device (100B) in immediate proximity to the first communication device using short-range communication with the second communication device, the connection request carrying an identifier for the second communication device, wherein no further short-range communication between the communication device and the second communication device occurs after the communication device having detected the second communication device using short-range communication; and
    establish a connection (430) between the first communication device and the second communication device over long-range internet or cellular communication, the connection being established for sharing content between the first communication device and the second communication device.

17. A method for use in a communication device (100) being part of a proximity-based sharing network (400), the communication device comprising a controller (210) and a radio frequency interface (230) configured to communicate via short-range communication and long-range internet or cellular communication, wherein the method comprises:
    detecting that a second communication device (100B) is in an immediate proximity to the communication device using short-range communication between the communication device and the second communication device, wherein no further short-range communication between the communication device and the second communication device occurs after the communication device having detected the second communication device using short-range communication;
    in response to detecting that the second communication device is in the immediate proximity to the communication device, automatically establishing a connection (430) for sharing content between the communication device and the second communication device, wherein the connection is established between the communication device and the second communication device over long-range internet or cellular communication, wherein automatically establishing the connection comprises sending a connection request to a server (410) for causing the server to establish the connection, the server not being the communication device nor the second communication device; and
    sharing the content between the communication device and the second communication device over long-range internet or cellular communication.

18. The method according to claim 17, wherein the content shared via the connection comprises a transfer of funds.

19. A method for use in a communication device (100B) being part of a proximity-based sharing network (400), the communication device comprising a controller (210) and a radio frequency interface (230) configured to communicate via short-range communication and long-range internet or cellular communication, the method comprising:
    receiving, by the controller, a connection request from server (410) responsive to the server receiving a device detection connection request from a second communication device (100) that detected the communication device in an immediate proximity to the second communication device using short-range communication, wherein no further short-range communication between the communication device and the second communication device occurs after the communication device having detected the second communication device using short-range communication;

sending, in response to the connection request, a connection response to the server to cause the server to establish a connection (430) for sharing content between the communication device and the second communication device, wherein the server establishes the connection over long range internet or cellular communication;

receiving content to be shared through said connection from the second communication device via the connection over long range internet or cellular communication.

20. A method for use in a server (410) configured to manage a proximity-based sharing network (400), said method comprising:

receiving a connection request from a first communication device (100A) in response to the first communication device detecting that a second communication (100B) is in an immediate proximity to the first communication device using short-range communication between the first communication device and the second communication device, said connection request carrying an identifier for the second communication device, wherein no further short-range communication between the communication device and the second communication device occurs after the communication device having detected the second communication device using short-range communication; and establishing a connection (430) between the first communication device and the second communication device, wherein the connection is established between the first communication and the second communication device over long-range internet or cellular communication.

21. A method for use in a communication device (100) comprising a controller (210) and a radio frequency interface (230), wherein the method comprises:

detecting that a second communication device (100B) is in an immediate proximity to the communication device using short-range communication between the communication device and the second communication device, wherein no further short-range communication between the communication device and the second communication device occurs after the communication device having detected the second communication device using short-range communication; and in response to detecting that the second communication device is in the immediate proximity to the communication device, automatically establishing a social media connection (430) between the communication device and the second communication device, wherein the social media connection is identified by a social media identifier, wherein the social media connection is established between the communication device and the second communication device over long-range internet or cellular communication for sharing content between the first communication device and the second communication device.

22. A non-transitory computer readable storage medium (30) encoded with instructions (31) that, when loaded and executed on the controller of the communication device (100, 200), causes the communication device to perform the method according to claim 21.

23. A method for use in a communication device (100) comprising a controller (210) and a radio frequency interface (230), wherein the method comprises:

detecting that a second communication device (100B) is in an immediate proximity to the communication device using short-range communication between the communication device and the second communication device, wherein no further short-range communication between the communication device and the second communication device occurs after the communication device having detected the second communication device using short-range communication; and in response to detecting that the second communication device is in the immediate proximity to the communication device, automatically establishing a financial connection (430) between the communication device and the second communication device for a transfer of funds, wherein the financial connection is initiated by the first communication device receiving a financial account identifier associated with the second communication device, wherein the financial connection is established between the communication device and the second communication device over long-range internet or cellular communication for the transfer of funds between the first communication device and the second communication device.

24. The method according to claim 23, wherein the method further comprises automatically executing a financial transfer over the connection for the transfer of funds in association with establishing the connection for the transfer of funds.

25. A non-transitory computer readable storage medium (30) encoded with instructions (31) that, when loaded and executed on a controller of a communication device (100, 200), causes the communication device to perform the method according to claim 17.

* * * * *